J. McA. LONG.
APPARATUS FOR MAKING ICE CREAM AND ANALOGOUS SUBSTANCES.
APPLICATION FILED SEPT. 26, 1914.
1,163,426. Patented Dec. 7, 1915.
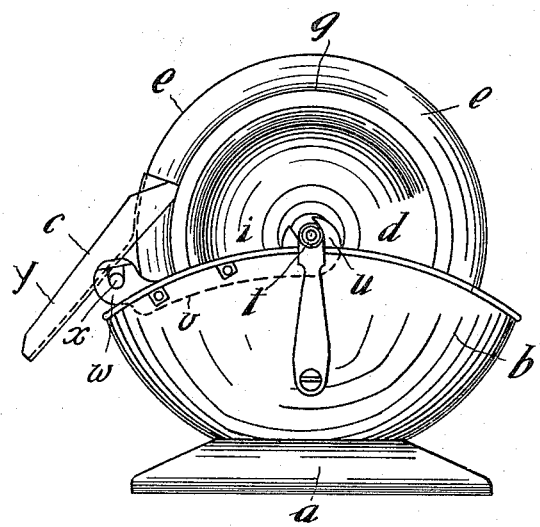
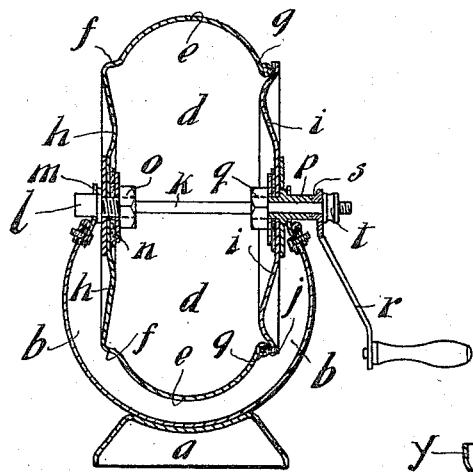
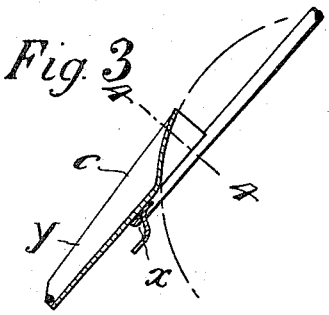
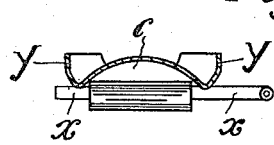

UNITED STATES PATENT OFFICE.

JOHN McAULIFFE LONG, OF MANCHESTER, ENGLAND.

APPARATUS FOR MAKING ICE-CREAM AND ANALOGOUS SUBSTANCES.

1,163,426.　　　　　　　Specification of Letters Patent.　　　　Patented Dec. 7, 1915.

Application filed September 26, 1914. Serial No. 863,698.

*To all whom it may concern:*

Be it known that I, JOHN McAULIFFE LONG, a subject of the King of Great Britain and Ireland, residing at 2 Bedford street, Manchester, England, have invented a new and useful Apparatus for Making Ice-Cream and Analogous Substances, of which the following is a specification.

My invention relates to improvements in apparatus for making ice cream and analogous substances and refers to apparatus of the type in which a hollow drum containing the freezing mixture is rotated within a vessel or container for the material to be frozen or cooled, the frozen material adhering to the periphery of the drum being removed by a hinged scraper device adapted to be brought tangential to the drum which serves also as a guide or spout to direct the removed material into any receptacle.

The objects of the improvements are first to provide a more convenient construction of the drum in which one of the sides and the periphery is in one piece and the other side is a removable plate adapted to engage against the free edge of the periphery and form a closure for the hollow drum, secondly to construct the bearings for mounting the drum so as to facilitate the removal of the side aforesaid, thirdly to construct the scraper so that its fit upon the drum periphery is improved and fourthly the construction of the bearings for the drum and the scraper as integral strips. I attain these objects by the means illustrated in the accompanying drawings.

Figure 1 is a side elevation of the apparatus complete with freezing drum, container for the material to be frozen and scraper for removing the frozen material. Fig. 2 is a central vertical section thereof. Fig. 3 is a longitudinal section of the preferred scraper. Fig. 4 is a section on line 4—4 of Fig. 3.

On this drawing *a* is the base, *b* shows one form of container for the material which is convenient because it may be very cheaply produced by pressing or spinning or a combination of these processes; *c* is the scraper for removing the material from the periphery of the drum *d*. The periphery *e* of the drum is of convex curvature as shown at Fig. 2 and on the side of it are the shoulders *f g*; *f* being pressed up from one side plate *h*, and *g* being curled over in the manner of a bead. The drum comprising the side *h*, shoulder *f* and periphery *e* can be produced from one flat blank of metal by pressing or spinning or a combination of the processes and the beaded edge forming the shoulder *g* strengthens the free edge and also forms a convenient surrounding surface to receive the removable side plate *i* which may engage the same by friction. The removable side *i* is provided with a rubber or other suitable packing washer *j* to make a secure closure.

The drum is provided with trunnions for mounting it for rotation by means of a rod *k* provided at one end with an enlarged part or trunnion *l* which has a collar *m* that takes a bearing against the side *h* of the drum when the rod is passed through a central perforation of the said side. On the inside a washer and packing such as *n* bear against the inner surface of plate *h* and a nut *o* is threaded onto the rod rigidly attaching the trunnion *l*. The rod *k* projects centrally through the opening at the other side of the drum and the removable plate is passed over it. The removable plate has a hollow trunnion *p* secured by a nut *q* on the inside of the plate *i* and by means of this hollow trunnion the plate is passed over the rod *k* and is pressed home against the bead *g*. The handle *r* with a projection *s* to engage a slot in trunnion *p* is then passed over the rod and a thumb nut or milled nut *t* threaded onto the end of the rod *k* makes the parts secure. The slotted bearings *u* on the container *b* are preferably inclined as shown at Fig. 1 to prevent the tendency of the drum to lift out of its bearings when being rotated. The slotted bearings *u* are preferably joined by an integral strip *v* to a jaw or slotted bearing *w* which serves for mounting the trunnion rod *x* of the scraper *c*. One bearing for the scraper is preferably an eye and the other the jaw or slotted bearing *w*.

The scraper *c* is formed with upturned side flanges *y* so that it forms a trough or channel and its forward end is bent laterally and also longitudinally for a short distance to fit the curve of the drum periphery. This is clearly shown at Figs. 1, 3, and 4 and by means of this formation the scraper may fit snugly on the convex drum surface and down the sides of such convex surface to the shoulders formed at *f* and *g*.

What I claim then is:

1. An apparatus for making ice cream and analogous substances comprising in combination a container for the material to be treated and a hollow drum for receiving the freezing material, means whereby said drum is mounted so as to be rotatable partially within the said container, and said drum being formed as to one side and its periphery, which is a wide transverse curve, in one piece terminating in a thickened edge and as to the other side as a separate removable plate, said plate being adapted to engage the free thickened edge of said periphery and form a closure for the drum, and means for retaining said side plate in closed position, said last mentioned means also forming part of the means for rotatably mounting said drum.

2. An apparatus for making ice cream and analogous substances comprising in combination a container for the material to be treated and a hollow drum for receiving the freezing material, said container having slotted bearing projections on the upper edge thereof and said drum having trunnions projecting from its sides to engage said bearings, said drum being formed with one side and its periphery, which is a wide transverse curve, terminating in a thickened edge and with the other side removable and adapted to close against the free edge of said periphery, one side and the peripheral wall being integral, and means for retaining the removable side in closed position, said last mentioned means also carrying one of said trunnions by which the drum is mounted.

3. Apparatus for making ice cream and analogous substances comprising in combination a container for the material to be treated, a hollow drum for receiving the freezing material and a scraper for removing the frozen material from the surface of the drum and delivering it where desired, said drum being formed with one side and a transversely curved periphery in one piece and with the other side forming a detachable closure plate and said scraper being curved at its forward portion both transversely and longitudinally with the periphery of said drum and said scraper having upwardly turned sides; bearings for said drum on said container and bearings for said scraper on said container both bearings on each side of said container being formed as a single strip substantially as described.

In testimony whereof, I have signed my name to this specification in the presence of two subscribing witnesses.

JOHN McAULIFFE LONG.

Witnesses:
MALCOLM SMETHURST,
GEORGE WEAVER.

Copies of this patent may be obtained for five cents each, by addressing the "Commissioner of Patents, Washington, D. C."